US011161270B2

(12) United States Patent
Pan

(10) Patent No.: US 11,161,270 B2
(45) Date of Patent: Nov. 2, 2021

(54) FIRE-RESISTANT WOODEN PRESSURE BOARD AND THE PRODUCTION METHOD THEREOF

(71) Applicant: ZHEJIANG YANMU TECHNOLOGY CO., LTD., Zhejiang (CN)

(72) Inventor: Dewang Pan, Zhejiang (CN)

(73) Assignee: ZHEJIANG YANMU TECHNOLOGY CO., LTD., Zhejiang (CN)

( * ) Notice: Subject to any disclaimer, the term of this patent is extended or adjusted under 35 U.S.C. 154(b) by 245 days.

(21) Appl. No.: 16/562,295

(22) Filed: Sep. 5, 2019

(65) Prior Publication Data

US 2021/0031401 A1 Feb. 4, 2021

(30) Foreign Application Priority Data

Aug. 2, 2019 (CN) ........................ 201910713539.4

(51) Int. Cl.

*B27K 3/08* (2006.01)
*B27M 1/02* (2006.01)
*C09K 13/02* (2006.01)
*C09K 3/22* (2006.01)

(52) U.S. Cl.

CPC ................. *B27K 3/08* (2013.01); *B27M 1/02* (2013.01); *B27K 2240/30* (2013.01)

(58) Field of Classification Search

None

See application file for complete search history.

(56) References Cited

U.S. PATENT DOCUMENTS 4,585,703 A * 4/1986 Taguchi .................. B27K 3/15 427/386
4,661,398 A * 4/1987 Ellis ........................ C04B 28/02 106/695
4,818,595 A * 4/1989 Ellis ........................ C04B 28/02 106/688
5,130,184 A * 7/1992 Ellis ........................ C04B 28/30 106/18.12

(Continued)

FOREIGN PATENT DOCUMENTS

CN 105437327 B 3/2016
CN 109592955 A 4/2019

*Primary Examiner* — Joseph D Anthony
(74) *Attorney, Agent, or Firm* — Olive Law Group, PLLC

(57) ABSTRACT

A fire-resistant wooden pressure plate is formed by conducting a cold pressing of 2~10 MPa to the uniformly mixed not less than 50 wt % of a wood-containing powder material and an additive. The additive may include metallic oxide, non-metallic oxide, hydrochloride, sulfate, phosphate, weak acid, and strong acid. With class-A fire resistance, in-water rotting resistance, class-0 mold resistance, little or no detectable formaldehyde, some products described herein can replace traditional plates incapable of resisting fire in the following fields: 1. wooden veneer, wooden door, furniture, kitchenware, etc.; 2. wooden wall, base course, ground foundation, suspended ceiling, etc.; 3. wooden flooring; 4. wooden fire-resistant door, fire-resistant wall, etc.; 5. wooden house, wooden bench, wooden bulletin plate, wooden billboard, walkway paving, etc.; 6. wood handicrafts, toys, etc.

8 Claims, 6 Drawing Sheets

No: Z18-091

6. Measurement Results
Results of test for the sound insulation performance of partition wall comprising fire-proof wooden pressure board

| | |
|---|---|
| Laboratory measurement of airborne sound reduction index (in accordance with National Measurement Specification GB/T 19889.3-2005 (ISO140-3.1995)) | |
| Consignor: | Zhejiang Yanmu Technology Co. Ltd. |
| Test date: | Oct.10. 2018 |
| Name of test piece: | partition wall comprising fire-proof wooden pressure board |
| Area of test piece: | 10 $m^2$ |
| Total thickness of test piece: | 120 mm; |
| Acoustic structure of test piece: | 12 mm thick fire-proof wooden pressure board (density 1100 kg/$m^3$)+96 mm cavity (wooden keel), filled with 50 mm thick 24 Kg/$m^3$ glass wool board+12 mm thick fire-proof wooden pressure board (density 1100 kg/$m^3$) |
| Temperature: | 28°C |
| Relative humidity: | 59% |

| Frequency (Hz) | Sound reduction index (dB) |
|---|---|
| 100 | 22.3 |
| 125 | 21.4 |
| 160 | 25.3 |
| 200 | 36.8 |
| 250 | 41.7 |
| 315 | 44.7 |
| 400 | 48.4 |
| 500 | 49.6 |
| 630 | 51.4 |
| 800 | 54.6 |
| 1000 | 57.1 |
| 1250 | 60.1 |
| 1600 | 62.3 |
| 2000 | 62.3 |
| 2500 | 59.5 |
| 3150 | 53.9 |
| 4000 | 59.6 |
| 5000 | 63.2 |

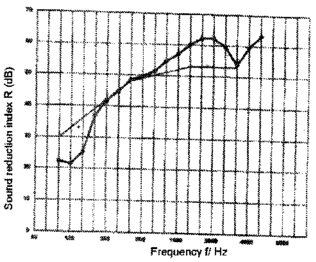

In accordance with the evaluation result of GB/T 50121-2005 (ISO 717-1): $R_W(C;C_{tr})$=49 (-6;-12) dB;
The evaluation result of this report is based on laboratory measurement results.

(56) References Cited

U.S. PATENT DOCUMENTS

| | | | | |
|---|---|---|---|---|
| 5,418,282 | A * | 5/1995 | Wiehn | B27N 1/003<br>252/607 |
| 2011/0094678 | A1 * | 4/2011 | Blount | C08H 6/00<br>156/336 |

* cited by examiner

No: Z18-091

6. Measurement Results

Results of test for the sound insulation performance of partition wall comprising fire-proof wooden pressure board

| Laboratory measurement of airborne sound reduction index (in accordance with National Measurement Specification GB/T 19889.3-2005 (ISO140-3.1995)) | |
|---|---|
| Consignor: | Zhejiang Yanmu Technology Co. Ltd. |
| Test date: | Oct.10, 2018 |
| Name of test piece: | partition wall comprising fire-proof wooden pressure board |
| Area of test piece: | 10 $m^2$ |
| Total thickness of test piece: | 120 mm; |
| Acoustic structure of test piece: | 12 mm thick fire-proof wooden pressure board (density 1100 $kg/m^3$)+96 mm cavity (wooden keel), filled with 50 mm thick 24 $Kg/m^3$ glass wool board+12 mm thick fire-proof wooden pressure board (density 1100 $kg/m^3$) |
| Temperature: | 28°C |
| Relative humidity: | 59% |

| Frequency (Hz) | Sound reduction index (dB) |
|---|---|
| 100 | 22.3 |
| 125 | 21.4 |
| 160 | 25.3 |
| 200 | 36.8 |
| 250 | 41.7 |
| 315 | 44.7 |
| 400 | 48.4 |
| 500 | 49.6 |
| 630 | 51.4 |
| 800 | 54.6 |
| 1000 | 57.1 |
| 1250 | 60.1 |
| 1600 | 62.3 |
| 2000 | 62.3 |
| 2500 | 59.5 |
| 3150 | 53.9 |
| 4000 | 59.6 |
| 5000 | 63.2 |

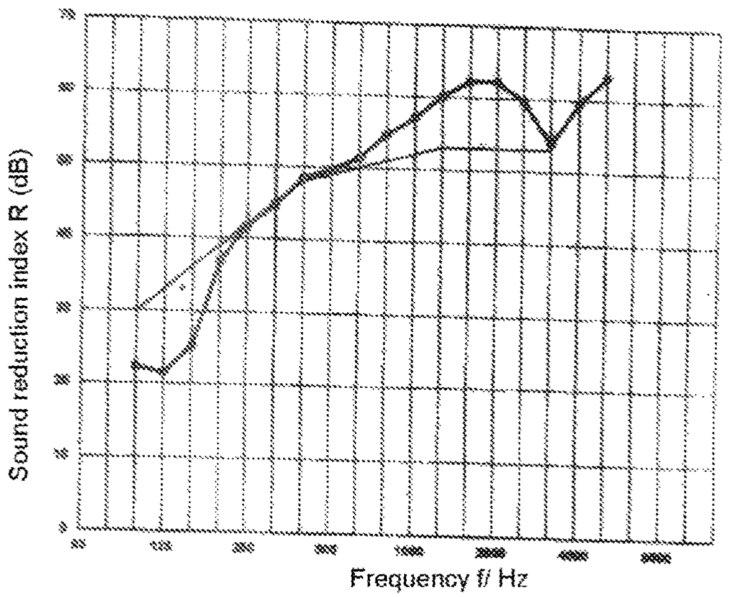

In accordance with the evaluation result of GB/T 50121-2005 (ISO 717-1): $R_W$ (C;$C_{tr}$)=49 (-6;-12) dB;
The evaluation result of this report is based on laboratory measurement results.

Fig 1

National Center for Quality Supervision and Test of Fire-proof Building Materials
Summary Table of Test Results Report No.: 2017101784

| No. | Test Item | Test Method | Requirements of Standard | | Test Results | Conclusion |
|---|---|---|---|---|---|---|
| 1 | Temperature rise in furnace, ℃ | GB/T 5464-2010 | A1 | ≤30 | 3 | Acceptable |
| 2 | Duration of combustion, s | GB/T 5464-2010 | | 0 | 0 | Acceptable |
| 3 | Mass loss rate, % | GB/T 5464-2010 | | ≤50.0 | 39.8 | Acceptable |
| 4 | Calorific value, MJ/kg | GB/T 14402-2007 | | ≤2.0 | 1.1 | Acceptable |
| 5 | Smoke toxicity, mg/L | GB/T 20285-2006 | $AQ_1$ ≥ 100.0, Experimental animals will not die within a poisoning period of 30 min and within three days after being poisoned, and will recover their average weight | | 100.0 Meet the requirements | Acceptable |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| Remark | The expanded uncertainty $U_{95}$ of test result of mass loss rate is 0.2%. | | | | | |

Fig 2

National Research Center of Testing Techniques for Building Materials
Test Report Center Number: WT2017B03C02746

| No. | Test Item | Unit of Measurement | Requirements of Standard | Measured Value | Individual Conclusion |
|---|---|---|---|---|---|
| 1 | Bacteria resistance rate | % | ≥90.00 | 100.0 | Conform to standard |
| 2 | Mold resistance rating | / | Class 0 or Class 1 | Class 0 | Conform to standard |
| 3 | Freezing and thawing resistance | / | / | No cracking and stratification after 25 cycles of freezing and thawing. | / |
| Remark | (Blank) | | | | |

====== The end of this report ======

Testing unit address: South Building of China Building Materials Academy, Guanzhuang, Chaoyang District, Beijing Tel: 65728538 Postcode:100024

Fig 3

National Research Center of Testing Techniques for Building Materials
Test Report Center Number (No): WT2017B03F00309

| No. | Test Item | Test Results | Test Standard |
|---|---|---|---|
| 1 | Density | 1.10 g/cm$^3$ | GB/T 17657-2013 |
| 2 | Moisture content | 17.8% | |
| 3 | Thickness expansion rate of water absorption of 24h | 0% | |
| 4 | Internal bond strength | 0.77 MPa | |
| 5 | Screw-holding force of board surface | 1140 N | |
| 6 | Breaking load | 760 N | GB/T 9775-2008 |
| 7 | Bittern resistance | No water, no damp | JC 688-2006 |
| 8 | Thermal conductivity | 0.24 W/ (m · K)<br>Mean temperature: 25.0°C | GB/T 10295-2008 |
| 9 | Radioactivity | Internal exposure index: 0.0 ( + ) | GB 6566-2010 |
| | | External exposure index: 0.0 ( + ) | |
| Remarks: (Blank) | | | |

Testing unit address: South Building of China Building Materials Academy, Guanzhuang, Chaoyang District, Beijing Tel: 65728S38 Postcode: 100024

Fig 4

National Research Center of Testing Techniques for Building Materials
Test Report Center Number (No): WT2017B03F00309

| No. | Test Item | Requirements of Standard | Test Results | Individual Conclusion |
|---|---|---|---|---|
| 10 | Released formaldehyde ((9~11) L desiccator test) | Class $E_1 \leqslant$ 1.5 mg/L<br>Class $E_2 \leqslant$ 5.0 mg/L | Not detected | Class $E_1$ |
| (Blank) | | | | |
| Remarks: Explanation on 'not detected': released formaldehyde < 0.1 mg/L. | | | | |

------------------------------------------------ The end of this report ------------------------------------------------

Testing unit address: South Building of China Building Materials Academy, Guanzhuang, Chaoyang District, Beijing Tel: 65728538 Postcode: 100024

Fig 5

National Research Center of Testing Techniques for Building Materials Test Report Center Number (No): WT2017B03F00344

| No. | Test Item | Test Results | Test Standard |
| --- | --- | --- | --- |
| 1 | Screw-holding force of the side of board | 1320 N | GB/T 17657-2013 |
| (Blank) | | | |
| Remarks: Blank | | | |

------------------------------ The end of this report ------------------------------

Testing unit address: South Building of China Building Materials Academy, Guanzhuang, Chaoyang District, Beijing Tel: 65728538 Postcode: 100024

Fig 6

FIRE-RESISTANT WOODEN PRESSURE BOARD AND THE PRODUCTION METHOD THEREOF

CROSS-REFERENCE TO RELATED APPLICATIONS

The application claims priority to Chinese Patent Application No. 201910713539.4 filed on Aug. 2, 2019.

TECHNICAL FIELD

The present invention relates to a fire-resistant wooden pressure board and the production method thereof, falling within the technical field of artificial fiber board.

PRIOR ART

Traditional artificial fiber boards are produced mainly by adding an adhesive to a woody fiber (wood-chips, etc.) used as major raw material, and conducting hot press process. The traditional artificial fiber boards are confronted with the following industrial problems. 1. The content of toxic harmful volatile substance such as formaldehyde etc. is high; 2. Combustion will occur upon ignition, and a large amount of dense smoke and toxic harmful substance will be released in the process of combustion, thus safety cannot be guaranteed; 3. Expansion will occur upon exposure to water, and the strength of product will drop sharply, resulting in the inapplicability for outdoor environment; in the environment with high humidity, the product will absorb moisture, expand and deform very easily, affecting service life; 4. Screw-holding force is poor, leading to the drastic decrease of installability and usability of product; 5. Damp environment will make it easy to get mildewed and rotten.

A China invention patent of which the patent publication number is CN 105437327 B disclosed a preparation method of a low-formaldehyde medium/high density fiber board capable of resisting moisture and mildew. The preparation method comprises: (1) woodchipping: cutting twigs or three kinds of residue in forestry (i.e., logging residue, rough-hew residue and processing residue) into wood chips of uniform size via a woodchipper; (2) sifting: causing the wood chips of operation (1) to go through a rocking sieve and conducting winnowing to reject off-specification wood chips and impurities; (3) pre-steaming: feeding the wood chips of operation (2) into a pre-steaming silo, and feeding them into a mill; (4) thermo-refining: decomposing the wood chips pre-steamed under a high temperature of 165~175° C. and a high pressure of 0.8~0.9 MPa into fibers via a defibrator; respectively adding 200~230 kg/m$^3$ of urea-formaldehyde resin adhesive, 6~8 kg/m$^3$ of refined paraffin, 1.5~2 kg/m$^3$ of curing agent, and acid black 2 solution accounting for 1%~1.2% of absolutely dry fiber to the fibers in a wood-pulp spraying pipe; adding water to the acid black 2 in a dissolving tank and increasing temperature to 50~70° C., with the mass ratio of water to acid black 2 in the acid black 2 solution being 4:1, and causing the solution to join the urea-formaldehyde resin adhesive via a screw pump and then adding the mixed solution into thermo-refining wood-pulp spraying pipe via a adhesive-applying pump; (5) drying: drying the thermo-refined fibers of operation (4) in a drying pipe under the action of an air flow with the velocity of 30 m/s, and mixing them with the powder of active carbon, with the inlet temperature of drying pipe being 175° C. or lower and outlet temperature being 50~70° C., keeping the moisture content of fiber at 8~10% via drying and mixing, with the powder of active carbon accounting for 1%~20% of absolutely dry fiber; (6) winnowing fibers: removing heavy fiber bundles, lumps of adhesive and other impurities in the fibers dried in operation (5); (7) spreading and forming: under the condition of mechanical spreading, causing dry fibers to go through a rocking feeding trough, and uniformly spreading them over the whole width to form a plate blank; (8) heating plate blank: pre-pressing the plate blank spread and formed in operation (7), and heating the fibers in advance via a pre-heating system before the pre-pressed plate blank enters a pressing machine; (9) hot pressing: causing the plate blank of operation (8) to enter the pressing machine under the condition of being sandwiched between the steel-bands of a dual steel-band continuous pressing machine, and compressing the plate blank between an upper moving steel-band and a lower moving steel-band, and transmitting pressure to the plate blank via a pressing plate, a rolling rod and the steel-bands under the action of a hydraulic cylinder; (10) cross-cut sawing: using a dual diagonal saw to cut the plate blank after the continuous flat pressing of operation (9) into a standard board with specified dimension according to requirements; (11) cooling: cooling the semi-finished product of fiber board in operation (10) by a board overturning cooling machine so that the temperature of board core layer is lower than 60° C., and conducting a 48-hour curing to the overturned and cooled rough board; (12) sanding and saw-cutting: polishing the surface of the rough board cooled in operation (11) by a sander, and cutting edges by a cutting saw.

Technical Problems

Thus, the complexity of carrying out the foregoing method can be known. Additionally, products obtained by this method need to be improved in terms of quality, especially flame retardancy and size stability after water absorption.

DETAILED DESCRIPTION

To solve the foregoing problems, some embodiments of the present invention provide a fire-resistant wooden pressure board. The fire-resistant wooden pressure board provided by the present invention has the following advantages. With high density, high strength and strong screw-holding force, the pressure board can be sawn or planed, and will not expand significantly after absorbing moisture, can resist fire, and will not get rotten or mildewed, etc.

In some embodiments a fire-resistant wooden pressure board is formed by conducting a cold pressing of 2~10 MPa to the uniformly mixed not less than 50 wt % of a wood powder material and an additive. The additive may (optionally) include a metallic oxide, a non-metallic oxide, a hydrochloride, a sulfate, a phosphate, a weak acid, and a strong acid in combination.

In some embodiments a metallic oxide component may include calcium oxide, magnesium oxide, zinc oxide, aluminum oxide, etc. or their combination.

In some embodiments a non-metallic oxide component may include silicon dioxide, boron oxide, etc. or their combination.

In some embodiments a hydrochloride component may include sodium chloride, calcium chloride, magnesium chloride, aluminum chloride, etc. or their combination.

In some embodiments a sulfate component may include sodium sulfate, calcium sulfate, aluminum sulfate, magnesium sulfate, etc. or their combination.

In some embodiments a phosphate component may include calcium phosphate, magnesium phosphate, zinc phosphate, aluminum phosphate, etc. or their combination.

In some embodiments a weak acid component may include acetic acid, oxalic acid, citric acid, maleic acid, phosphoric acid, carbonic acid, etc. or their combination.

In some embodiments a strong acid component may include hydrochloric acid, sulfuric acid, nitric acid, etc. or their combination.

For example the weight percentages of components may include these:

Metallic oxide 10~20,
Non-metallic oxide 5~10,
Hydrochloride 1~2,
Sulfate 1~2,
Phosphate 1~2,
Weak acid 5~10,
Strong acid 5~10.

Alternatively or additionally the density of the fire-resistant wooden pressure board is 0.8~1.6 g/cm$^3$, and moisture content is 5~25 wt %, and expansion rate of water absorption of 24 h is 5% or less, and static bending strength is 15~50 MPa, and internal bond strength is 0.5~8 MPa, and elastic modulus is 3000~42000, and screw-holding force of board surface is 650~2000N.

Alternatively or additionally the fireproof rating of the fire-resistant wooden pressure board is class A, and the amount of released formaldehyde reaches the standard of 'not detected', and mold resistance rating reaches class 0.

Alternatively or additionally the thermal conductivity of the fire-resistant wooden pressure board may be 0.1~0.5 W/(mk).

Compared with the plate materials of prior art, the present invention has remarkable characteristics.

(1) Versus Wood-Plastic Board

Mixed with a large amount of polymer component, a wood-plastic board has the characteristic of water-resistance and mold-resistance. However, its flame retardance rating is relatively low, so combustion will occur upon ignition, and toxic smoke will be generated, and screw-holding force is relatively poor, and aging resistance is poor. Besides, the content of polymer component is high, so texture is not good, and the product cannot replace solid wood. Additionally, warping and deforming will occur, and the product cannot be degraded.

(2) Versus Plywood

A plywood is also called assembled board, and is produced by conducting a hot pressing to layers of thin wood after the application of an adhesive. The thin wood of different layer may be different. The plate material has a texture of solid wood, but its flame retardance rating is also low, so combustion will occur upon ignition. Besides, cracking, expansion, warping, deforming, etc. will easily occur after water absorption. Additionally, the content of formaldehyde etc. is high, and the product is not environment-friendly.

(3) Versus Fiber Board

In prior art, the plate material closest to the present invention is fiber board. A fiber board is also called density board, and is produced by applying an adhesive to a xylem fiber or other plant fibers used as raw material. The biggest problem of a fiber board is that it will absorb moisture easily, and the expansion degree after absorbing moisture is large, leading to the warping and deforming of plate material. Besides, its flame retardance rating is relatively low, so combustion will occur upon ignition. Additionally, the adhesive is not environment-friendly.

Thus it can be seen that plate materials mainly using wood will be confronted with technical problem in terms of size stability, flame retardance and environment-friendliness. The plate material of the present invention mainly comprises wood of which the content reaches 50 wt % or more, and it may be 70 wt %, and even 90 wt % or more is possible. Seen from water-absorption performance, expansion rate of water absorption of 24 hours is 5% or less, which shows a remarkable technical progress. Besides, in regard of other performance parameters, for instance, static bending strength is 15~50 MPa, and internal bond strength is 0.5~8 MPa, and elastic modulus is 3000~12000, and screw-holding force of board surface is 650~2000 N. In terms of comprehensive performance, the present invention shows a remarkable progress compared with the plate material of prior art.

In some variants the present invention may provide a production method of the fire-resistant wooden pressure board.

A production method of the fire-resistant wooden pressure board, comprising:

a. keeping a fineness of raw material at 20~100 mesh, and mixing it uniformly;
b. laying boards;
c. conducting pressing under normal temperature, with a pressure kept at 2~10 MPa;
d. maintaining the pressure for 12~36 hours;
e. taking out plate material and balancing it under normal temperature for 3~10 days.

In some variants, the main raw material chosen in the production of plate material is lignocellulose which is an flocculent organic fibrous matter obtained via conducting a chemical treatment and a mechanical treatment to woods. The lignocellulose may be a cellulose powder produced by pulverizing woods from a fast-growing tree such as pine tree, cedar, etc., and the lignocellulose may also be a cellulose powder produced by pulverizing other raw material such as woods of mulberry, poplar, elm as well as the offcuts of various solid wood boards. The fineness only needs to be kept at 20~100 mesh. The moisture content of raw material required by the production is not high, because it can be adjusted in the process of production.

In some variants the raw material of operation a comprises a wood-chip powder and an additive dispersed in a liquid (e.g. water), and the liquid dispersion of the additive is used to wet the wood-chip, and uniformly-mixed material will be obtained after uniform wetting.

In some variants the additive includes a metallic oxide, a non-metallic oxide, a hydrochloride, a sulfate, a phosphate, a weak acid, and a strong acid.

As an optional variant, in operation b, the paving thickness of each board is 2~15 cm, and pre-pressing thickness is 0.6~7.5 cm.

As an optional variant, in operation c, the object of pressing is a plate-mold assembly having a plurality of repeating units composed of a pre-pressed plate and semi-finished product piled up by flat plate mold.

As an optional variant, the height of the plate-mold assembly is 1~2 m, and the height after pressing is 0.8~1.2 m.

As an optional variant, in operation c, the plate-mold assembly will be locked by mold-locking assembly after being pressed to specified thickness, then it will move out from pressing machine and go to the operation of maintaining pressure.

The operations of pressing and maintaining pressure is a novel and significant feature in some variants. Distinguished from prior art, the pressing of the present invention is cold pressing, and a pre-pressing will be conducted firstly, and then it will go to the stage of pressing with a pressing machine, and pressure value is set as 2~10 MPa. After pressing the plate-mold assembly to specified thickness, mold-locking will be conducted. Finally, a plate material will be formed after 12~36 h of pressure maintaining. In this process, a physicochemical reaction has occurred inside plate material. Such reaction is a slow exothermic reaction, and under such high pressure, materials will be further compressed so that the bound water inside lignocellulose will exude, and active material such as magnesium oxide, magnesium chloride, etc. will start hydration reaction to slowly form a hydraulic magnesium gel material and form a hydraulic silicate gel material. It is usually thought that some part of the heat released from reaction is heat of hydration while some part is heat of binding reaction or heat of cross-linking reaction.

In some embodiments one or more of the following advantageous effects may result: (1) The product of this invention may have a class A fire-resistant classification, becoming superior to traditional boards incapable of resisting fire;

(2) The product may be resistant to rot in water, and its mold resistance rating reaches class 0, solving such problems of traditional boards as 'incapable of resisting water', 'deforming and rotting in water', 'limited service life';

(3) The amount of detected formaldehyde may be zero or very small (i e less than 50 parts per million by weight), and any other harmful volatile gas is not contained, thoroughly solving the industrial problem of traditional composite board that the contained formaldehyde will do harm to consumers;

(4) The product may have a strong capability in terms of sound insulation and thermal insulation, solving the problem that the sound-insulation performance of traditional solid wood and composite boards is poor;

(5) The product may have a relatively high performance in terms of adjusting humidity on its own, and as the humidity of outer environment changes, the board will absorb or release moisture automatically, serving a function of adjusting space humidity;

(6) The product may use xylem fiber as major raw material, thus its cost is low, and its sale price will greatly drop compared with solid wood boards, truly satisfying consumers' requirements via good quality and low price.

(7) The product has a wide range of application, and has made a breakthrough at the application scope of traditional boards on the basis of the characteristics of product itself, broadening the application field of product. The product may be mainly used for: 1. wooden veneer, wooden door, furniture, kitchenware, etc.; 2. wooden wall partition, base course, ground foundation, suspended ceiling, etc.; 3. wooden flooring; 4. wooden fire-resistant door, fire-resistant wall, etc.; 5. wooden house, wooden bench, wooden bulletin board, wooden billboard, walkway paving, etc.; 6. wooden handicrafts, toys, etc.

BRIEF DESCRIPTION OF THE DRAWINGS

FIG. 1 is a result table on the sound-insulation performance of a preferred embodiment of the present invention;

FIG. 2 is a result table on the combustion performance of a preferred embodiment of the present invention;

FIG. 3 is a result table on the bacteria resistance and the freezing and thawing resistance of a preferred embodiment of the present invention;

FIG. 4 is a result table on the density, moisture content, etc. of a preferred embodiment of the present invention.

FIG. 5 is a result table on the released formaldehyde of a preferred embodiment of the present invention;

FIG. 6 is a result table on the board surface screw-holding force of a preferred embodiment of the present invention.

BEST MODE FOR CARRYING OUT THE INVENTION

1. Material-mixing: 2480 KG of xylem fiber was weighed out, and the following additives were weighed out: 146 kg of magnesium oxide, 59 kg of magnesium chloride, 6 kg of silicon dioxide, 18 kg of calcium sulfate, 10 kg of calcium phosphate, 15 kg of acetic acid, and 20 kg of hydrochloric acid. The additives were dispersed in water to form a liquid dispersion with a certain concentration, then the uniformly-dispersed liquid dispersion was used to wet xylem fiber, and after uniform wetting, the uniformly-mixed material went into a material-spreading silo;

2. Material-spreading: The material-spreading thickness of each plate was 5 cm, and pre-pressing thickness was 2.2 cm, and weight was 45 kg~47 kg, and the number of spread plates was 65, and the plate pile-up height was 1.75 m~1.85 m;

3. Pressing: Pressing was conducted via a pressing machine, with a pressure of 4 Mpa;

4. Mold-locking: After the plate-mold assembly was pressed to specified thickness, mold-locking was conducted, then the mold-locking assembly moved out from the pressing machine and go to the operation of maintaining pressure;

5. Pressure-maintaining: Mold-locking state was kept for 24 h;

6. Plate-separating: After reaction was completed, mold-unlocking and plate-separating was conducted;

7. Leaving plate in a still condition: The plate was placed in a semi-finished product storehouse for 7 days;

8. Rough edge-sawing: Due to roughness, each side of plate material was cut off by 1 cm via a saw;

9. Drying: The temperature of drying tunnel was kept at 90~100° C., and drying time was 1.5 h, and the moisture content of needle-inserting method was 13%~15%.

10. Sanding: A 40-mesh sandpaper was used at the 1st sander holder, and a 80-mesh sandpaper was used at the 2nd sander holder, and a 120-mesh sandpaper was used at the 3rd sander holder, and a 180-mesh sandpaper was used at the 4th sander holder, and the required thickness of finished product is ±0.05 mm, and surface shall be smooth, and everywhere shall be rubbed by sandpaper;

11. Fine edge-sawing: The thickness at front-end and both sides of plate was smaller than normal range after sanding, and diagonal line difference is within ±3 mm.

10, 12. Packing: Each plate was checked to see whether there is breakage, unrubbed part, etc., and packing was conducted in accordance with requirements.

As shown in FIG. 1~FIG. 5, the plate material produced in this embodiment has good performance in many aspects.

Specifically, density is 1.1 g/cm$^3$. Moisture content is 10~20 wt %. Expansion rate of water absorption of 24 h is 0. Internal bond strength is 0.77 MPa. Screw-holding force of board surface is 1140 N. Screw-holding force of board side is 1320 N. Breaking load is 760 N. In regard to bittern resistance, there is no water or damp. Thermal conductivity is 0.24 wW/(m·k). Released formaldehyde is 'not detected'. Calorific value is 1.1 MJ/kg. Mass loss rate of combustion is 39.8%.

EMBODIMENTS

Embodiment 1

1. Material-mixing: 2000 KG of xylem fiber, 100 kg of magnesium oxide, 50 kg of magnesium chloride, 23 kg of calcium chloride, 16 kg of silicon dioxide, 10 kg of magnesium sulfate, and 18 kg of hydrochloric acid were weighed out, and the additives were dispersed in water to form a liquid dispersion with a certain concentration, then the uniformly-dispersed liquid dispersion was used to wet xylem fiber, and after uniform wetting, the uniformly-mixed material went into a material-spreading silo;

2. Material-spreading: The material-spreading thickness of each plate was 5 cm, and pre-pressing thickness was 2 cm, and weight was 40 kg~42 kg, and the number of spread plates was 60, and the plate pile-up height was 1.65 m~1.75 m;

3. Pressing: Pressing was conducted via a pressing machine, with a pressure of 4 Mpa;

4. Mold-locking: After the plate-mold assembly was pressed to specified thickness, mold-locking was conducted, then the mold-locking assembly moved out from the pressing machine and go to the operation of maintaining pressure;

5. Pressure-maintaining: Mold-locking state was kept for 36 h;

6. Plate-separating: After reaction was completed, mold-unlocking and plate-separating was conducted;

7. Leaving plate in a still condition: The plate was placed in a semi-finished product storehouse for 7 days;

8. Rough edge-sawing: Due to roughness, each side of plate material was cut off by 1 cm via a saw, and diagonal line difference is within ±3 mm;

9. Packing: Each plate was checked to see whether there is breakage, and packing was conducted in accordance with requirements.

In this embodiment, there is no need to conduct sanding treatment, so no need to conduct drying. The plate material of this embodiment has a certain degree of water-absorbing property and moisture-absorbing property, so the moisture content of plate material will be automatically adjusted by the plate material according to ambient environment. The plate material of this embodiment has a certain degree of water-absorbing property and moisture-absorbing property, but it will hardly expand after water absorption or dilution, and can still maintain a good size-stability and a good mechanical properties.

Embodiment 2

1. Material-mixing: 2500 KG of xylem fiber, 165 kg of magnesium oxide, 68 kg of magnesium chloride, 12 kg of boron oxide, 16 kg of aluminum sulfate, 10 kg of magnesium phosphate, 10 kg of citric acid, and 15 kg of sulfuric acid were weighed out, and the additives were dispersed in water to form a liquid dispersion with a certain concentration, then the uniformly-dispersed liquid dispersion was used to wet xylem fiber, and after uniform wetting, the uniformly-mixed material went into a material-spreading silo;

2. Material-spreading: The material-spreading thickness of each plate was 10 cm, and pre-pressing thickness was 5 cm, and weight was 80 kg~82 kg, and the number of spread plates was 30, and the plate pile-up height was 1.65 m~1.75 m;

3. Pressing: Pressing was conducted via a pressing machine, with a pressure of 6 Mpa;

4. Mold-locking: After the plate-mold assembly was pressed to specified thickness, mold-locking was conducted, then the mold-locking assembly moved out from the pressing machine and go to the operation of maintaining pressure;

5. Pressure-maintaining: Mold-locking state was kept for 24 hours;

6. Plate-separating: After reaction was completed, mold-unlocking and plate-separating was conducted;

7. Leaving plate in a still condition: The plate was placed in a semi-finished product storehouse for 7 days;

8. Rough edge-sawing: Due to roughness, each side of plate material was cut off by 1 cm via a saw;

9. Drying: The temperature of drying tunnel was kept at 90~100° C., and drying time was 1.5 h, and the moisture content of needle-inserting method was 13%~15%.

10. Sanding: A 40-mesh sandpaper was used at the 1st sander holder, and a 80-mesh sandpaper was used at the 2nd sander holder, and a 120-mesh sandpaper was used at the 3rd sander holder, and a 180-mesh sandpaper was used at the 4th sander holder, and the required thickness of finished product is ±0.05 mm, and surface shall be smooth, and everywhere shall be rubbed by sandpaper;

11. Fine edge-sawing: The thickness at front-end and both sides of plate was smaller than normal range after sanding, and diagonal line difference is within ±3 mm.

12. Packing: Each plate was checked to see whether there is breakage, unrubbed part, etc., and packing was conducted in accordance with requirements.

Performance Test

From FIG. 1, we can see that when frequency is 125 Hz, sound reduction index is 21.4 dB; when frequency is 250 Hz, sound reduction index is 41.7 dB; when frequency is 500 Hz, sound reduction index is 49.6 dB; when frequency is 1000 Hz, sound reduction index is 57.1 dB; when frequency is 2000 Hz, sound reduction index is 62.3 dB; when frequency is 4000 Hz, sound reduction index is 59.6 dB. The evaluation result according to GB/T 50121-2005 (ISO717-1) is: $R_w$ (C; $C_{tr}$)=49 (−6; −12) dB.

From FIG. 2, we can see that duration of combustion of this product is 0, and mass loss rate is 39.8%, and calorific value is 1.1 MJ/kg, and smoke toxicity $AQ_1$=100, and experimental animals will not die within a poisoning period of 30 min and within three days after being poisoned, and will recover their average weight.

From FIG. 3, we can see that the standard requirement of bacteria resistance rate is ≥90%, and this product is 100%; the standard requirement of mold resistance rating is class 0 or class 1, and this product is class 0; There is no requirement for the standard of freezing and thawing resistance, and the measured value of this product is ‘no cracking and stratification after 25 cycles of freezing and thawing’.

From FIG. 4, we can see that the density of this product is 1.1 $g/m^3$, moisture content is 17.8%, and thickness expansion rate of water absorption of 24 h is 0%, internal bond strength is 0.77 MPa, and screw-holding force of board surface is 1140 N, and breaking load is 760 N, and bittern resistance is ‘no water, no damp’, and thermal conductivity is 0.24 W/(m·k), and internal exposure index is 0.0, and external exposure index is 0.0. From FIG. 5, we can see that released formaldehyde is ‘not detected’.

From FIG. 6, we can see that screw-holding force of board side is 1320 N, test standard is GB/T 17657-2013.

Thus it can be seen that a product of this invention may have some remarkable advantages compared with various plate materials of prior art.

What is claimed:

1. A fire-resistant wooden pressure plate, characterized in that the fire-resistant wooden pressure plate is formed by conducting a cold pressing of 2~10 megapascals (MPa) to a uniform mixture of wood powder and an additive, wherein the wood powder is at a concentration of not less than 50 wt. %, and wherein the additive includes a metallic oxide, a non-metallic oxide, a hydrochloride, a sulfate, a phosphate, a weak acid, and a strong acid.

2. The fire-resistant wooden pressure plate according to claim 1, characterized in that the fire-resistant wooden pressure plate's density is 0.8~4.6 g/cm$^3$, and moisture content is 5~25 wt %, and expansion rate of water absorption of 24 h is 5% or less, and static bending strength is 15~50 MPa, and internal bond strength is 0.5~8 MPa, and elastic modulus is 3000~12000, and screw-holding force of board surface is 650~2000 N.

3. The fire-resistant wooden pressure plate according to claim 2, characterized in that the fire-resistant wooden pressure plate's fireproof rating is class A, and the amount of released formaldehyde reaches the standard of 'not detected', and mold resistance rating reaches class 0.

4. A production method of fire-resistant wooden pressure plate, comprising:

a. keeping a fineness of a raw material at 20~100 mesh, and mixing it uniformly;
b. laying boards;
c. conducting pressing under normal temperature, with a pressure kept at 2~10 MPa;
d. maintaining the pressure for 12~36 hours; and
e. taking out the plate material and balancing it under normal temperature for 3~10 days; wherein in operation step a., the raw material comprises a wood-chip powder at not less than 50 wt. % and an additive which includes a metallic oxide, a non-metallic oxide, a hydrochloride, a sulfate, a phosphate, a weak acid, and a strong acid, and wherein the additive is dispersed in water, and the additive liquid dispersion is used to wet the wood-chip powder, and uniformly-mixing the wetted material.

5. The production method of fire-resistant wooden pressure plate according to claim 4, characterized in that in operation b, the laying thickness of each board is 2~15 cm, and pre-pressing thickness is 0.6~7.5 cm.

6. The production method of fire-resistant wooden pressure plate according to claim 4, characterized in that in operation c, pressed object is a board-mold assembly having a plurality of repeating units composed of a pre-pressed plate and semifinished product piled up by flat plate mold.

7. The production method of fire-resistant wooden pressure plate according to claim 6, characterized in that the plate-mold assembly's height is 1~2 m, and the height after pressing is 0.8~1.2 m.

8. The production method of fire-resistant wooden pressure plate according to claim 6, characterized in that in operation c, the plate-mold assembly will be locked by mold-locking assembly after being pressed to specified thickness, then it will move out from pressing machine and go to the operation of maintaining pressure.

* * * * *